US006836722B2

(12) United States Patent
Yook

(10) Patent No.: US 6,836,722 B2
(45) Date of Patent: Dec. 28, 2004

(54) METHOD AND SYSTEM FOR DIAGNOSING A FAILURE OF A REAR OXYGEN SENSOR OF A VEHICLE

(75) Inventor: Chul-Soo Yook, Suwon (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 10/334,923

(22) Filed: Dec. 31, 2002

(65) Prior Publication Data

US 2003/0225505 A1 Dec. 4, 2003

(30) Foreign Application Priority Data

May 31, 2002 (KR) .................................... 2002-0030668

(51) Int. Cl.[7] .......................... F02D 41/14; G06F 19/00

(52) U.S. Cl. ....................... 701/114; 701/102; 701/115; 60/274; 60/285; 73/117.3

(58) Field of Search ................................ 701/102, 114, 701/115, 110; 60/274, 276, 285; 73/23.32, 117.3, 116, 118.1

(56) References Cited

U.S. PATENT DOCUMENTS 5,020,499 A * 6/1991 Kojima et al. .............. 123/479
5,533,332 A * 7/1996 Uchikawa .................... 60/274
5,758,491 A * 6/1998 Agustin et al. ............... 60/274
5,927,260 A * 7/1999 Kishimoto et al. ........ 73/117.3
6,644,017 B2 * 11/2003 Takahashi et al. ............ 60/285
6,718,754 B2 * 4/2004 Kobayashi et al. ........... 60/277

FOREIGN PATENT DOCUMENTS

| | | | | |
|---|---|---|---|---|
| DE | 69705150 T | | 3/2002 | |
| JP | 2003-90251 A | * | 3/2003 | ........... F02D/41/14 |

* cited by examiner

*Primary Examiner*—Hieu T. Vo
(74) *Attorney, Agent, or Firm*—Morgan Lewis & Bockius LLP

(57) ABSTRACT

A method and system for diagnosing a failure of a rear oxygen sensor is provided. The sensor is determined to have failed if the difference between a maximum output value and a minimum value of the rear oxygen sensor is less than a first value, and if it is not, it is determined whether the difference is between the first value and a second value. If so, the air/fuel mixture is controlled to be richer than a stoichiometric air/fuel ratio for a predetermined period. Then, an output values of a front oxygen sensor and the rear oxygen sensor are respectively compared to first and second threshold values. If the output value of the front oxygen sensor is greater than the first threshold value, and the output value of the rear oxygen sensor is less than the second threshold value, it is determined that the rear oxygen sensor has failed.

16 Claims, 2 Drawing Sheets

METHOD AND SYSTEM FOR DIAGNOSING A FAILURE OF A REAR OXYGEN SENSOR OF A VEHICLE

FIELD OF THE INVENTION

The present invention relates to a rear oxygen sensor of a vehicle, and more particularly, to a method and a system for diagnosing the failure of a first oxygen sensor using a second oxygen sensor.

BACKGROUND OF THE INVENTION

OBD-II, which is an updated On-Board Diagnostic standard effective in cars sold in the United States after 1996, requires a diagnosing device for emissions treating systems that are related to tailpipe emissions and evaporative emissions, and also requires a device for diagnosing a malfunction of such a diagnosing device. A car having an OBD-II system is generally provided with two oxygen sensors (dual oxygen sensor system) to detect oxygen content in exhaust gas. The dual oxygen sensor system comprises a front oxygen sensor, which is located between an engine and a catalytic converter, that is, upstream of the catalytic converter, and a rear oxygen sensor located downstream of the catalytic converter.

If the oxygen sensor does not operate normally, precise air/fuel ratio control cannot be performed and noxious emissions increase. Therefore, in order to meet emission regulations, it is necessary to diagnose a failure of the oxygen sensor. In particular, an electronic engine control unit determines whether or not the catalytic converter operates normally based on signals from the rear oxygen sensor. So diagnosing a failure of the rear oxygen sensor is important in reducing exhaust emissions.

SUMMARY OF THE INVENTION

In a preferred embodiment of the present invention, a method for diagnosing a failure of a rear oxygen sensor of a vehicle comprises: determining whether a predetermined monitoring condition exists; determining whether a vehicle speed is 0; determining whether a difference between a maximum value and a minimum value of monitored signals of the rear oxygen sensor is less than a first value; determining whether the difference is between the first value and a second value, the second value being greater than the first value, if the difference is not less than the first value; injecting fuel for a predetermined period such that an air/fuel ratio becomes a predetermined air/fuel ratio, the predetermined air/fuel ratio being richer than a stoichiometric air/fuel ratio, if the difference is between the first value and the second value; detecting an output value of the front oxygen sensor and an output value of the rear oxygen sensor after injecting fuel for the predetermined period; and determining whether the detected output value of the front oxygen sensor is greater than a first threshold value, wherein a front air/fuel mixture is determined to be rich if an output value of the front oxygen sensor is greater than the first threshold value, and the detected output value of the rear oxygen sensor is less than a second threshold value, and wherein a rear air/fuel mixture is determined to be rich if an output value of the rear oxygen sensor is greater than the second threshold value.

It is preferable that the method further comprises generating a fault diagnosis signal if the difference between the maximum value and the minimum value of the rear oxygen sensor is less than the first value.

It is further preferable that the method further comprises generating a fault diagnosis signal if the detected output value of the front oxygen sensor is greater than the first threshold value, and the detected output value of the rear oxygen sensor is less than the second threshold value. Preferably, the first value is 0.078V. It is preferable that the second value is a minimum difference between a maximum output value and a minimum output value of the rear oxygen sensor for a diagnosis of a catalytic converter, and the minimum difference is preferably 0.3V. It is preferable that the predetermined air/fuel ratio is 0.85 of lambda, the first threshold value is 0.5V, and the second threshold value is 0.45V.

Preferably, if fuel is reduced by a fully-closed throttle, or by a predetermined map table according to engine load and the halt is maintained for a predetermined reduced period after a vehicle has run for a predetermined run period in a condition that: (1) an engine speed is higher than a predetermined speed, (2) a volumetric efficiency is greater than a predetermined efficiency, and (3) a vehicle speed is greater than a predetermined speed, it is determined that the predetermined monitoring condition exists.

In another preferred embodiment of the present invention, a system for diagnosing a failure of a rear oxygen sensor of a vehicle comprises: a vehicle speed sensor, an engine speed sensor, an air flow sensor, a throttle position sensor, a front oxygen sensor, a rear oxygen sensor, a control unit, and a fuel injector. The vehicle speed sensor generates a signal responsive to a vehicle speed. The engine speed sensor generates a signal responsive to an engine speed. The air flow sensor generates a signal responsive to an air flow rate. The throttle position sensor generates a signal responsive to a throttle position. The front oxygen sensor and a rear oxygen sensor generate signals responsive to an oxygen content in exhaust emission, the front and rear oxygen sensor being disposed upstream and downstream respectively of a catalytic converter. The control unit diagnoses a failure of the rear oxygen sensor, and the fuel injector injects fuel according to an injection command signal of the control unit. In this embodiment, the control unit is programmed to execute an embodiment of the diagnosis method as summarized previously.

An additional preferred embodiment of the method for diagnosing a failed oxygen sensor comprises adjusting an engine fuel/air ratio so that the engine produces a corresponding adjusted exhaust; detecting a first oxygen content of the adjusted exhaust with a first oxygen sensor; detecting a second oxygen content of the adjusted exhaust with a second oxygen sensor; comparing the first oxygen content to a first threshold; comparing the second oxygen content to a second threshold; and concluding that the second oxygen sensor has failed if the first oxygen content is above the first threshold and the second oxygen content is below the second threshold.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

Like numerals refer to similar elements throughout the several drawings.

DESCRIPTION OF THE PREFERRED EMBODIMENTS

Figure 1:
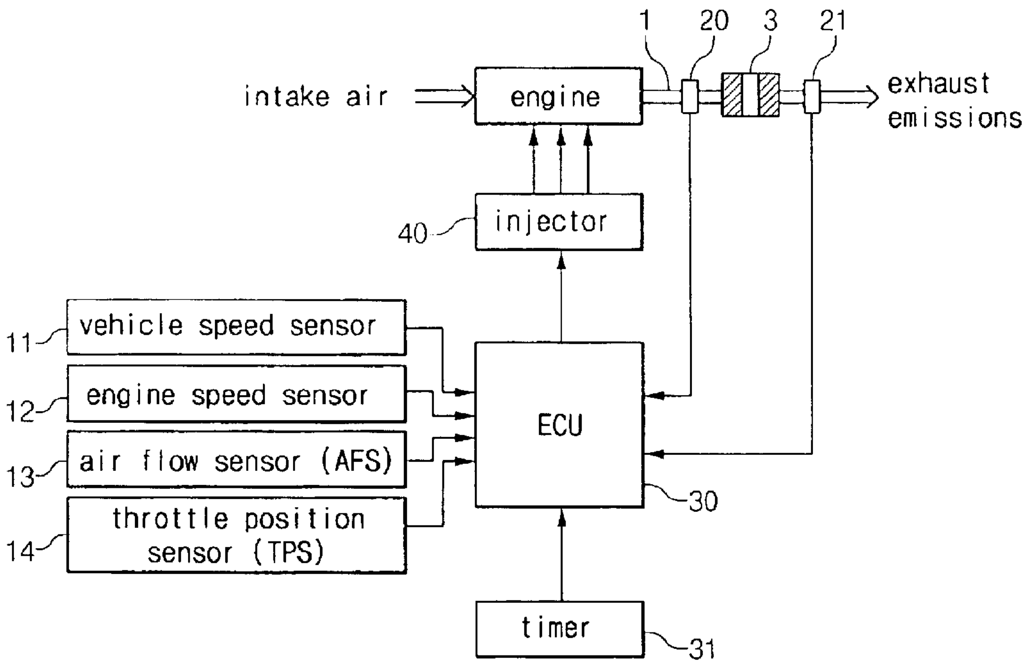
FIG. 1 is a block diagram of a system for treating exhaust emissions to which a preferred embodiment of a method for diagnosing a failed rear oxygen sensor may be applied.

As shown in FIG. 1, a diagnostic system for a rear oxygen sensor includes an engine control unit (ECU) 30. The ECU 30 receives various signals from various sensors, such as a vehicle speed signal from a vehicle speed sensor 11. The ECU also receives an engine RPM signal from an engine speed sensor 12 and an air flow rate signal from an air flow sensor 13. In addition, the ECU receives a throttle position signal from an throttle position sensor 14 and signals form a from an oxygen sensor 20 and a rear oxygen sensor 21. A fuel injector 40 injects fuel according to an injection command signal input from the ECU 30. The ECU 30 may detect a monitoring time using a timer 31. The ECU includes a microprocessor, a memory, and other necessary hardware and software components as will be understood by persons of ordinary skill in the art to permit the ECU 30 to communicate with sensors and execute the a diagnostic method as described herein.

Also in the system, a catalytic converter 3 is disposed in an exhaust pipe 1. A front oxygen sensor 20 and a rear oxygen sensor 21 are respectively located upstream and downstream of the catalytic converter 3. The front and rear oxygen sensors 20 and 21 generate a voltage signal that is proportional to the difference in oxygen content between in the exhaust gas and the ambient air.

Figure 2:
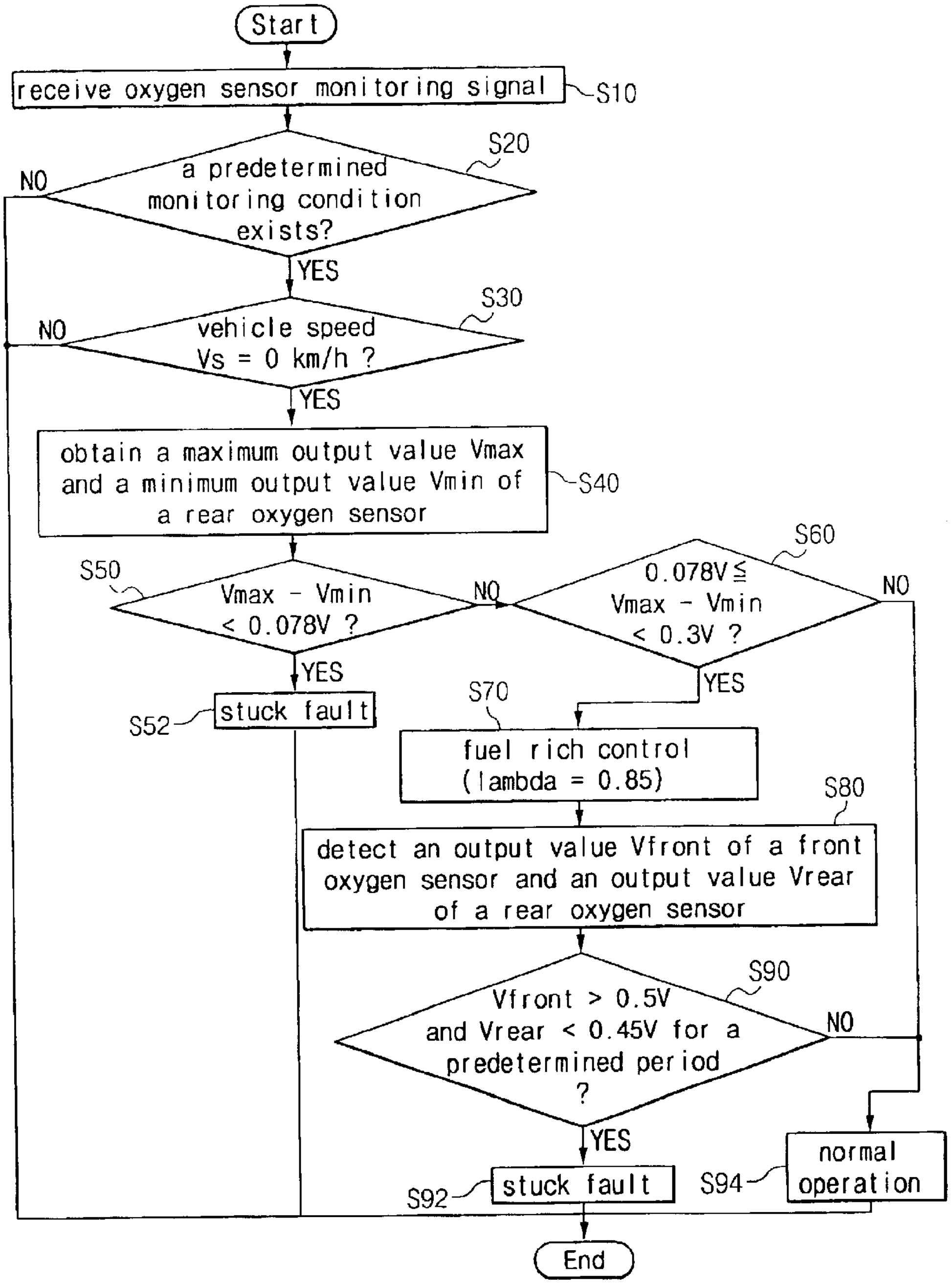
FIG. 2 is a flowchart of a method for diagnosing a failed rear oxygen sensor according to a preferred embodiment of the present invention.

As shown in FIG. 2, in step S10 the ECU 30 receives monitoring signals in order to determine whether a predetermined monitoring condition exists. The monitoring signals include an engine RPM signal of the engine speed sensor 12 and the appropriate signals from the air flow sensor 13, the vehicle speed sensor 11, and the throttle position sensor 14.

In step S20, the ECU 30 determines, based on the monitoring signals, whether a predetermined monitoring condition exists. The predetermined monitoring conditions require that fuel flow is reduced. This is determined by the throttle valve being fully closed, or by loss of engine load, which may be determined by a map table. This reduced fuel flow must be maintained for a predetermined reduced period (for example, 2 seconds) after a vehicle has run for a predetermined run period (for example, 10 seconds) with the engine speed higher than 1500 RPM, the volumetric efficiency greater than 40%, and the vehicle speed greater than 30 km/h.

The volumetric efficiency is a ratio of an amount of intake air to a volume of a cylinder. It may be determined by a predetermined lookup table or be calculated by an equation apparent to one of ordinary skill in the art. It is preferable that the volumetric efficiency is determined based on an amount of intake air and an engine speed.

If it is determined that the predetermined monitoring condition does not exist in step S20, the procedure ends. Otherwise, in step S30 the ECU 30 determines whether a vehicle speed is 0 based on the vehicle speed signal input from the vehicle speed sensor 11. If so, in step S40 the ECU 30 obtains a maximum output value Vmax and a minimum output value Vmin of the rear oxygen sensor 21 by reading the monitored signals of the rear oxygen sensor 21. The maximum output value Vmax and the minimum output value Vmin are monitored while the vehicle is travelling.

In step S50, the ECU 30 determines whether the difference between the maximum output value Vmax and the minimum output value Vmin is less than a first value. The first value may uniquely be determined for each oxygen sensor, and preferably it is set as 0.078V. Thus, if the difference between the maximum output value and the minimum output value of the rear oxygen sensor 21 is less than 0.078V (the first value), the ECU determines a failure of the rear oxygen sensor 21 and generates a corresponding fault signal in step S52.

If the difference between the maximum output value and the minimum output value is not less than 0.078V in step S50, then in step S60 the ECU determines whether the difference is between 0.078V and a second value in step S60.

It is preferable that the second value is a minimum value of the difference between a maximum output value and a minimum output value of the rear oxygen sensor 21. For example, this second value, the minimum difference, may be set as 0.3V. If a difference between the maximum and the minimum output values of the rear oxygen sensor is greater than the first value (0.078V) but less than the second (0.3V), a further diagnosis of the operation of the catalytic converter can be performed based on the signals of the rear oxygen sensor.

In step S60, if the difference between the maximum output value and the minimum output value is greater than 0.3V (the second value), the ECU 30 determines that the rear oxygen sensor normally operates and generates a corresponding diagnosis signal. If the difference between the maximum output value and the minimum output value is between 0.078V and 0.3V, in step S70 the ECU 30 controls the injected fuel quantity so the air/fuel ratio becomes a predetermined rich air/fuel ratio for a predetermined (rich control) period. For example, the predetermined air/fuel ratio is richer than a stoichiometric air/fuel ratio (lambda=1) if it is set as 0.85 of lambda. The stoichiometric air/fuel ratio is the mass of 14.7 kg of air to 1 kg of gasoline that is theoretically necessary for complete combustion. The excess air factor or air ratio (lambda) indicates the deviation of the actual air/fuel ratio from the theoretically required ratio. That is, lambda value is a ratio of actual induced air mass to theoretical air requirement The predetermined (rich control) period is easily determined through experiments so that after performing the rich control of the air/fuel ratio for the predetermined (rich control) period, the output value of the front oxygen sensor is greater that the first threshold value, and the output value of the rear sensor is less than the second threshold value.

Then, in step S80, the ECU 30 simultaneously detects an output value of the front oxygen sensor 20 and an output value of the rear oxygen sensor 21, at a point after performing the rich control of the air/fuel ration for the c of step S70. In step S90 the ECU 30 determines whether the output value of the front oxygen sensor 20 is greater than a first threshold value for determining a rich air/fuel ratio, and whether the output value of the rear oxygen sensor 21 is less than a second threshold value for determining a rich air/fuel ratio. The first threshold value is preferably set as 0.5V, and the second threshold value is preferably set as 0.45V.

During normal operation, if the output value of the front oxygen sensor is greater than the first threshold value, the ECU 30 determines that air/fuel mixture is rich. Similarly, if the output value of the rear oxygen sensor is greater than the second threshold value, the ECU 30 determines that air/fuel mixture is rich.

Thus, when an air/fuel ratio is richer than a stoichiometric air/fuel ratio, that is, lambda is less than 1, the output voltage of the front oxygen sensor 20 should be greater than 0.5V, and the output voltage of the rear oxygen sensor 21 should also be greater than 0.45V.

Consequently, if the air/fuel mixture is regulated to be rich for the predetermined period, the output value of the front oxygen sensor should be greater than 0.5V, and the output value of the rear oxygen sensor should also be greater than 0.45V. Therefore, in step S90 if it is determined that the output voltage of the front oxygen sensor 20 is greater than 0.5V and the output voltage of the rear oxygen sensor 21 is less than 0.45V for the predetermined period, it is concluded that the rear oxygen sensor 21 has a failure. The ECU 30 then generates a corresponding fault signal in step S92. If the rear output voltage is greater than 0.45V, the ECU 30 determines that the rear oxygen sensor 21 normally operates and generates a corresponding diagnosis signal in step S94.

In the diagnostic method for the rear oxygen sensor 21 according to the preferred embodiment of the present invention, when the difference between the maximum output value and the minimum output value is between 0.078V and 0.3V, the fault diagnosis is performed by controlling the air/fuel ratio to be richer than the stoichiometric air/fuel ratio and determining whether the rear oxygen sensor operates normally using the output voltage of the front oxygen sensor and the rear oxygen sensor. Thus, diagnosis of the rear oxygen sensor can be performed even when the difference between the maximum value and the minimum value of the rear oxygen sensor is between 0.078V and 0.3V.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

What is claimed is:

1. A system for diagnosing a failure of a rear oxygen sensor of a vehicle comprising:

a control unit;

a vehicle speed sensor communicating with the control unit and generating a signal responsive to a vehicle speed;

an engine speed sensor communicating with the control unit and generating a signal responsive to an engine speed;

an air flow sensor communicating with the control unit and generating a signal responsive to an air flow rate;

a throttle position sensor generating signals responsive to a throttle position;

a front oxygen sensor and a rear oxygen sensor generating signals responsive to oxygen content in exhaust emission, the front and rear oxygen sensor being disposed upstream and downstream, respectively, of a catalytic converter and communicating with the control unit; and a fuel injector for injecting fuel according to injection command signals from the control unit based on said signals generated by said sensors;

wherein the control unit is programmed to execute a diagnostic program comprising determining whether a predetermined monitoring condition exists:

determining whether a vehicle speed is 0;

determining whether a difference between a maximum value and a minimum value of monitored signals of the rear oxygen sensor is less than a first value;

determining whether the difference is between the first value and a second value, the second value being greater than the first value, if the difference is not less than the first value; injecting fuel for a predetermined period such that an air/fuel ratio becomes a predetermined air/fuel ratio, the predetermined air/fuel ratio being richer than a stoichiometric air/fuel ratio;

if the difference is between the first value and the second value, detecting an output value of the front oxygen sensor and an output value of the rear oxygen sensor after injecting fuel for the predetermined period; and determining whether the detected output value of the front oxygen sensor is greater than a first threshold value, wherein a front air/fuel mixture is determined to be rich if an output value of the front oxygen sensor is greater than the first threshold value, and the detected output value of the rear oxygen sensor is less than a second threshold value, and wherein a rear air/fuel mixture is determined to be rich if an output value of the rear oxygen sensor is greater than the second threshold value.

2. A method for diagnosing a failure of a rear oxygen sensor of a vehicle comprising:

determining whether a predetermined monitoring condition exists;

determining whether a vehicle speed is 0;

determining whether a difference between a maximum value and a minimum value of monitored signals of the rear oxygen sensor is less than a first value;

determining whether the difference is between the first value and a second value, the second value being greater than the first value, if the difference is not less than the first value;

injecting fuel for a predetermined period such that an air/fuel ratio becomes a predetermined air/fuel ratio, the predetermined air/fuel ratio being richer than a stoichiometric air/fuel ratio, if the difference is between the first value and the second value;

detecting an output value of the front oxygen sensor and an output value of the rear oxygen sensor after injecting fuel for the predetermined period; and determining whether the detected output value of the front oxygen sensor is greater than a first threshold value, wherein a front air/fuel mixture is determined to be rich if an output value of the front oxygen sensor is greater than the first threshold value, and the detected output value of the rear oxygen sensor is less than a second threshold value, and wherein a rear air/fuel mixture is determined to be rich if an output value of the rear oxygen sensor is greater than the second threshold value.

3. The method of claim 2, further comprising generating a fault diagnosis signal if the difference between the maximum value and the minimum value of the rear oxygen sensor is less than the first value.

4. The method of claim 2, further comprising generating a fault diagnosis signal if the detected output value of the front oxygen sensor is greater than the first threshold value, and the detected output value of the rear oxygen sensor is less than the second threshold value.

5. The method of claim 2, wherein the first value is 0.078V.

6. The method of claim 2, wherein the second value is a minimum difference between a maximum output value and a minimum output value of the rear oxygen sensor for a diagnosis of a catalytic converter.

7. The method of claim 6, wherein the minimum difference is 0.3V.

8. The method of claim 2, wherein the predetermined air/fuel ratio is 0.85 of lambda.

9. The method of claim 2, wherein the first threshold value is 0.5V.

10. The method of claim 2, wherein the second threshold value is 0.45V.

11. The method of claim 2, wherein if fuel is reduced by a fully-closed throttle, or by a predetermined map table according to engine load and the reduction is maintained for a predetermined reduced period after a vehicle has run for a predetermined run period in a condition that: (1) an engine speed is higher than a predetermined speed, (2) a volumetric efficiency is greater than a predetermined efficiency, and (3) a vehicle speed is greater than a predetermined speed, it is determined that the predetermined monitoring condition exists.

12. A method for diagnosing a failed oxygen sensor, comprising:

adjusting an engine fuel/air ratio so that the engine produces a corresponding adjusted exhaust;

detecting a first oxygen content of the adjusted exhaust with a first oxygen sensor;

detecting a second oxygen content of the adjusted exhaust with a second oxygen sensor;

comparing the first oxygen content to a first threshold;

comparing the second oxygen content to a second threshold; and concluding that the second oxygen sensor has failed if the first oxygen content is above the first threshold and the second oxygen content is below the second threshold.

13. The method of claim 12, wherein the adjusting adjusts the fuel/air ratio to be rich.

14. The method of claim 13, wherein the first oxygen sensor is upstream of a catalytic converter.

15. The method of claim 14, wherein the first threshold is 0.5V and the second threshold is 0.45V.

16. The method of claim 12, further comprising concluding that the second oxygen sensor has failed if a maximum voltage from the second oxygen sensor is greater than a minimum voltage from the second oxygen sensor by less than a first value.

* * * * *